(12) United States Patent
Strain

(10) Patent No.: US 9,199,231 B2
(45) Date of Patent: Dec. 1, 2015

(54) WATER TREATMENT SYSTEM AND METHOD

(71) Applicant: Peter Strain, Shanty Bay (CA)

(72) Inventor: Peter Strain, Shanty Bay (CA)

(73) Assignee: 1720618 ONTARIO INC., Barrie (CA)

( * ) Notice: Subject to any disclaimer, the term of this patent is extended or adjusted under 35 U.S.C. 154(b) by 97 days.

(21) Appl. No.: 14/104,496

(22) Filed: Dec. 12, 2013

(65) Prior Publication Data

US 2014/0166582 A1    Jun. 19, 2014

Related U.S. Application Data

(60) Provisional application No. 61/736,974, filed on Dec. 13, 2012.

(51) Int. Cl.
| | |
|---|---|
| *C02F 1/42* | (2006.01) |
| *B01J 49/00* | (2006.01) |
| *C02F 1/68* | (2006.01) |
| *C02F 1/78* | (2006.01) |
| *C02F 1/00* | (2006.01) |

(52) U.S. Cl.
CPC .......... *B01J 49/0069* (2013.01); *B01J 49/0086* (2013.01); *C02F 1/42* (2013.01); *C02F 1/68* (2013.01); *C02F 1/78* (2013.01); *C02F 1/008* (2013.01); *C02F 2001/425* (2013.01); *C02F 2201/782* (2013.01); *C02F 2201/784* (2013.01); *C02F 2303/04* (2013.01); *C02F 2303/16* (2013.01)

(58) Field of Classification Search
None
See application file for complete search history.

(56) References Cited

U.S. PATENT DOCUMENTS

| | | |
|---|---|---|
| 5,236,722 A | 8/1993 | Schroeder |
| 6,006,387 A | 12/1999 | Cooper et al. |
| 6,287,515 B1 * | 9/2001 | Koosman et al. ............... 422/22 |
| 6,723,293 B2 | 4/2004 | Jensen |
| 6,726,817 B1 | 4/2004 | Gruett |
| 7,488,424 B2 | 2/2009 | Gruett et al. |
| 7,563,361 B2 | 7/2009 | Gruett et al. |
| 8,163,173 B1 | 4/2012 | Dellecave et al. |
| 2002/0166817 A1 | 11/2002 | Gruett |
| 2004/0016706 A1 | 1/2004 | Minnix |

(Continued)

FOREIGN PATENT DOCUMENTS

EP    2433909 A1    3/2012

OTHER PUBLICATIONS

Furrowpump web site http://www.furrowpump.com/Resources/toptenfactorstoconsiderozone.pdf, May 1998.*

(Continued)

*Primary Examiner* — Chester Barry
(74) *Attorney, Agent, or Firm* — Gilbert's LLP; Matthew D. Powell

(57) ABSTRACT

Embodiments of a water treatment system, a water treatment method, and an ozone kit for a water treatment system are provided. The water treatment system includes an ozone gas source; a regenerating fluid source; a water tank; a manifold having a first port in fluid communication with the regenerating fluid source, a second port in fluid communication with an outlet of the ozone gas source, and a third port in fluid communication with the water tank via a venturi nozzle; and a control system configured to: cause regenerating fluid to be drawn through the venturi nozzle into the water tank; and cause ozone gas to be drawn through the venturi nozzle into the water tank.

16 Claims, 3 Drawing Sheets

(56) References Cited

U.S. PATENT DOCUMENTS

| | | | |
|---|---|---|---|
| 2004/0026451 A1* | 2/2004 | Jones | 222/129.1 |
| 2004/0055969 A1 | 3/2004 | Barnes | |
| 2004/0154998 A1 | 8/2004 | Minnix | |
| 2005/0236338 A1 | 10/2005 | Minnix | |
| 2006/0027463 A1 | 2/2006 | Lavelle et al. | |
| 2009/0145820 A1 | 6/2009 | Gruett et al. | |
| 2012/0305488 A1* | 12/2012 | Gruett | C02F 1/008 210/660 |
| 2013/0075313 A1 | 3/2013 | Handy | |
| 2013/0098845 A1 | 4/2013 | Gruett et al. | |
| 2013/0104742 A1* | 5/2013 | Deo et al. | 99/275 |

OTHER PUBLICATIONS

Lenntech web page—ozone injection techniques http://www.lenntech.com/systems/ozone/injection/ozone-injection.htm (undated).*

Quality Water Treatment web page, ozone water treatment system http://www.qualitywatertreatment.com/ozone_systems, htm (undated).*

Well Water—Water Technology Magazine 2003 http://www.cwtozone.com/uploads/SalesDocs/Markets/Potable%20Water%20/Papers/New%20Articles/Well%20Water%20WTM%20NA-%202003.pdf.*

Furrowpump web site http://www.furrowpump.com/Resources/toptenfactorstoconsiderozone.pdf, (May 1998).

Lenntech web page—ozone injection techniques http://www.lenntech.com/systems/ozone/injection/ozone-injection.htm, (undated).

Quality Water Treatment web page, ozone water treatment system http://www.qualitywatertreatment.com/ozone_systems.htm, (undated).

* cited by examiner

WATER TREATMENT SYSTEM AND METHOD

CROSS-REFERENCE TO RELATED APPLICATION

This application claims priority under 35 U.S.C. 119(e) from U.S. Provisional Patent Application Ser. No. 61/736,974 filed on Dec. 13, 2012.

FIELD OF THE INVENTION

The following relates generally to water treatment and in particular to a water treatment system, a water softener regeneration method, and to an ozone kit for a water treatment system.

BACKGROUND OF THE INVENTION

Water softening systems have long been used to soften water by removing magnesium, calcium and other metal cations from hard water. The softened water is typically more suitable than hard water for allowing soaps and detergents to efficiently clean. Furthermore, softened water causes far less lime scale build up within water pipes than hard water, allowing the water pipes to remain substantially free of such blockages so water can freely flow.

Water softening systems are often positioned near to where water enters a home, office, or industrial building from an external source, such as a well or municipal water distribution system, so that the water can be softened prior to its further distribution and use. Such systems typically comprise a water tank storing water softening media, a brine source for periodically regenerating the softening media, and a control system for switching between a service mode and a regeneration mode.

During service mode, water entering the water softening system is caused to pass through the water softening media within the water tank. The water softening media is typically an ion-exchange resin, to which sodium ions are connected. The ion-exchange resin serves to capture the magnesium, calcium and other metal cations from the incoming hard water and replace them with the sodium ions, thereby to soften the water. In time, as more and more softened water is produced, this ion exchange leads to a condition in which there is no longer an effective amount of sodium ions in the resin, such that further incoming hard water will not undergo softening. As such, the resin must be regenerated.

During regeneration, which is often done at night or during another period where demand on softened water is low, the control system of the water softening system exits service mode and enters regeneration mode. This typically involves producing salty brine by bringing water into contact with salt stored within a brine tank. The resin is then flushed with water in a backwash operation to remove impurities and impure water from the water tank, and then the produced brine is drawn into the water tank via a venturi nozzle. The brine then contacts the resin within the water tank to regenerate the resin. This involves the brine performing a regenerating ion-exchange with the resin, during which the calcium, magnesium and other metal cations that were affixed to the resin during service mode are separated from the resin and replaced with sodium from the brine. After this operation, the resin is rinsed to remove excess brine and the water softening system having regenerated the resin can re-enter service mode.

Other water treatment systems are available for use alone or in addition to a water softener for disinfecting water by removing bacteria or other organisms from the water before it is used. For example, it is known to bring ozone gas into contact with the water to be disinfected. Ozone gas can be very effective at killing waterborne organisms.

Ozone gas treatment systems may employ electric air pumps for injecting ozone gas into the water to be disinfected. Such ozone gas treatment systems are expensive and complex, and further require regular specialized servicing in order to continue to work effectively. Alternative systems employ water restricting devices to create suction in a line for suctioning ozone gas, using water pressure from an auxiliary water supply pump. However, problems with effective suction of ozone gas arise when the water supply pump cannot produce a suitable amount of water pressure to accordingly produce a suitable amount of suction. Additional complex devices are also installed on a water tank to remove excess ozone gas from the water.

SUMMARY OF THE INVENTION

According to an aspect, there is provided a water treatment system comprising an ozone gas source; a regenerating fluid source; a water tank; a manifold having a first port in fluid communication with the regenerating fluid source, a second port in fluid communication with an outlet of the ozone gas source, and a third port in fluid communication with the water tank via a venturi nozzle; and a control system configured to: cause regenerating fluid to be drawn through the venturi nozzle into the water tank; and cause ozone gas to be drawn through the venturi nozzle into the water tank.

According to another aspect, there is provided a water softener regeneration method comprising drawing regenerating fluid into a water tank via a venturi nozzle to regenerate a treatment media; and drawing ozone gas into the water tank via the venturi nozzle to form a layer of ozone gas within the water tank.

According to another aspect, there is provided an ozone kit for a water treatment system that comprises a regenerating fluid source, a water tank and a control system, the kit comprising: an ozone gas source; and a manifold having a first port configured to be in fluid communication with the regenerating fluid source, a second port configured to be in fluid communication with an outlet of the ozone gas source, and a third port configured to be in fluid communication with a venturi nozzle of the water tank.

BRIEF DESCRIPTION OF THE DRAWINGS

Embodiments will now be described with reference to the appended drawings in which.

DETAILED DESCRIPTION

The following relates to using a draw cycle of a water softener valve to draw ozone gas into a water tank. While it is common to draw regenerating fluid such as brine into the water tank during a brine draw regeneration cycle, the following relates to systems and methods involving a further draw cycle or portion of a single draw cycle during which it is at least primarily ozone gas, not the regenerating fluid, which is drawn into the water tank. The ozone gas is drawn into the tank in a manner so as to form a layer of ozone gas within the water tank that remains above both the water softening media and the water remaining therein. The addition of complex structures for bringing the ozone gas into contact with the water to be treated is not required, a high concentration of ozone gas is caused to be present in the layer, and any unused ozone gas and air simply remain at the top of the water tank instead of necessarily being introduced into the water that remains in the water tank. Employing a draw cycle to draw ozone gas into the water tank obviates the need for additional complex stages and structures for treating water with the ozone gas, and for additional structures for removing excess ozone gas from the water. Effective integration of water softening and water disinfection can thereby be provided at a low initial installation cost, and can be maintained inexpensively.

Figure 1:
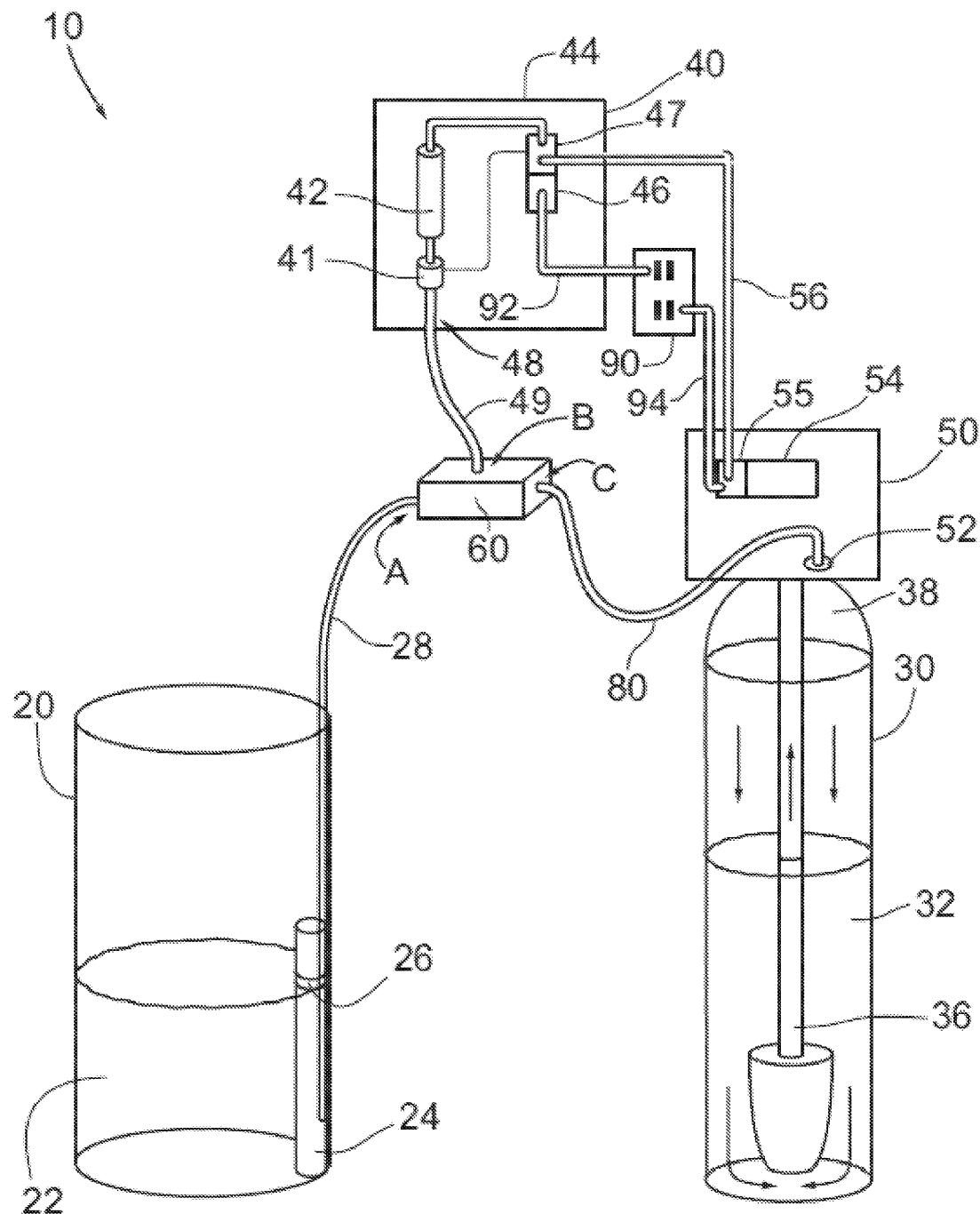
FIG. 1 is a schematic diagram of a water treatment system according to an embodiment.

Turning now to FIG. 1, there is shown a water treatment system 10 in accordance with one aspect. Water treatment system 10 generally includes a brine tank 20, a water tank 30, an ozone gas source 40, and a water softener valve 50.

In this embodiment, brine tank 20 serves as a source of regenerating fluid. The fluid in this embodiment is salt brine—a solution of sodium chloride and water. Brine tank 20 stores sodium chloride salt 22 into which water may be introduced in order to produce the brine. A float tube 24 and a float 26 are positioned within the brine tank 20, and partly inserted within float tube 24 is brine tube 28 for conveying source water for forming brine to brine tank 20 and for also conveying the formed brine away from brine tank 20, during regeneration. In this embodiment, brine tube 28 is a ⅜ inch plastic tube.

Water tank 30 stores water softening media which, in this embodiment, is a cation softener media mixture 32 of fine and coarse particles. Water tank 30 further includes a riser tube 36 through which treated water is conveyed for use outside of the water softener system 10.

Also in this embodiment, water softener valve 50 is an electronic control valve, operating at pressures of between 20 and 125 psi (pounds per square inch). Water softener valve 50 includes electronic circuitry to transform a 115 VAC, 60 Hz supply into 12 VDC at 850 Ma (milliAmperes) or 10.2 Watts for operation of the water softener valve 50. Water softener valve 50 is rated to handle a temperature range of 40 to 115 degrees Fahrenheit. Water softener valve 50 includes a control system that includes a control board 54 and a relay terminal 55 for switching between operating modes.

In this embodiment, the ozone gas can be introduced into the water tank 30 as will be described in order to form an ozone gas layer 38 that remains at the top of the water tank 30.

Ozone gas source 40 incorporates an ozone gas generator 42 for generating ozone gas. Ozone gas generator 42 is positioned within a storage box 44 along with a control board 46 having a solid state relay switch 47 to which it is electrically connected. The solid state relay switch 47 is also electrically connected to relay terminal 55 of water softener valve 50 and thereby operable by water softener valve 50 via as will be described. In this embodiment, ozone gas generator 42 is a corona discharge ozone gas generator operating at 12 VDC from an 115V input to produce between 0.200 and 0.220 Milligrams/hour of ozone gas for conveying out of outlet 48 of ozone gas source 40. The rate of ozone output by the ozone gas source 40 is preferably adjustable by service personnel or a consumer based on various factors including the volume of the water tank 30, quality of source water, amount of ozone desired in the water tank 30, local regulations, and perhaps other factors.

The water softener valve 50 receives source water and, depending on the mode of the water treatment system 10, will direct the source water into the water tank 30 to be treated, or will direct the source water into the brine tank 20 for producing brine with the salt (regeneration mode) via a venturi nozzle 52.

A manifold 60 is provided and includes a first port A in fluid communication with brine tank 20 via the brine tube 28, a second port B in fluid communication with outlet 48 of ozone gas source 40 via conduit 49, and a third port C in fluid communication with the venturi nozzle 52 of water softener valve 50 via a conduit 80. Venturi nozzle 52 is, in turn, in fluid communication with the water tank 50. A function of manifold 60 is to provide pathways for the fluids such as ozone gas, brine and water to pass between water softener valve 50, ozone gas source 40 and brine tank 20, such that ozone gas or brine can each be conveyed along conduit 80 as described herein. In this embodiment, manifold 60 is plastic pipe configured in a T-junction, though alternatives are possible. When conveying water to the brine tank 20 for forming brine, the third port C receives water conveyed along conduit 80 from the water softener valve 50 and the water is conveyed through valve 60 via the first port A into the brine tank 20. When conveying brine from the brine tank 20 to water tank 30 for regenerating the water softening media 32, the first port A of T-junction 60 receives the brine and the brine is conveyed via the third port C towards the venturi nozzle 52 of water softener valve 50 for introduction into the water tank 30. When conveying ozone gas from the outlet 48 of ozone gas source 40 to water tank 30 for forming the ozone gas layer 38, the second port B of T-junction 60 receives the ozone gas via conduit 49 and the ozone gas is conveyed via the third port C towards the venturi nozzle 52 for introduction into the water tank 30.

Ozone gas source 40 and water softener valve 50 each receive input power from electrical reception outlet 90 via electrical cords 92 and 94, respectively, in a known manner.

During a service mode, source water to be treated is introduced into the water tank 30 so as to flow through the ozone gas layer 38 for purification prior to reaching the water softening media 32 for softening. The resultant purified and softened water is drawn through the riser tube 36 and out of the water treatment system 10 for use as drinking water or for other uses. The water softener valve 50 meters the water drawn out of water treatment system 10 in order to gauge whether it is appropriate to regenerate the water softening media 32 so that it can be effective for softening the water. Alternatively, the water softener valve 50 may simply be configured to periodically enter into a regeneration mode rather than metering the drawn water.

Figure 2:
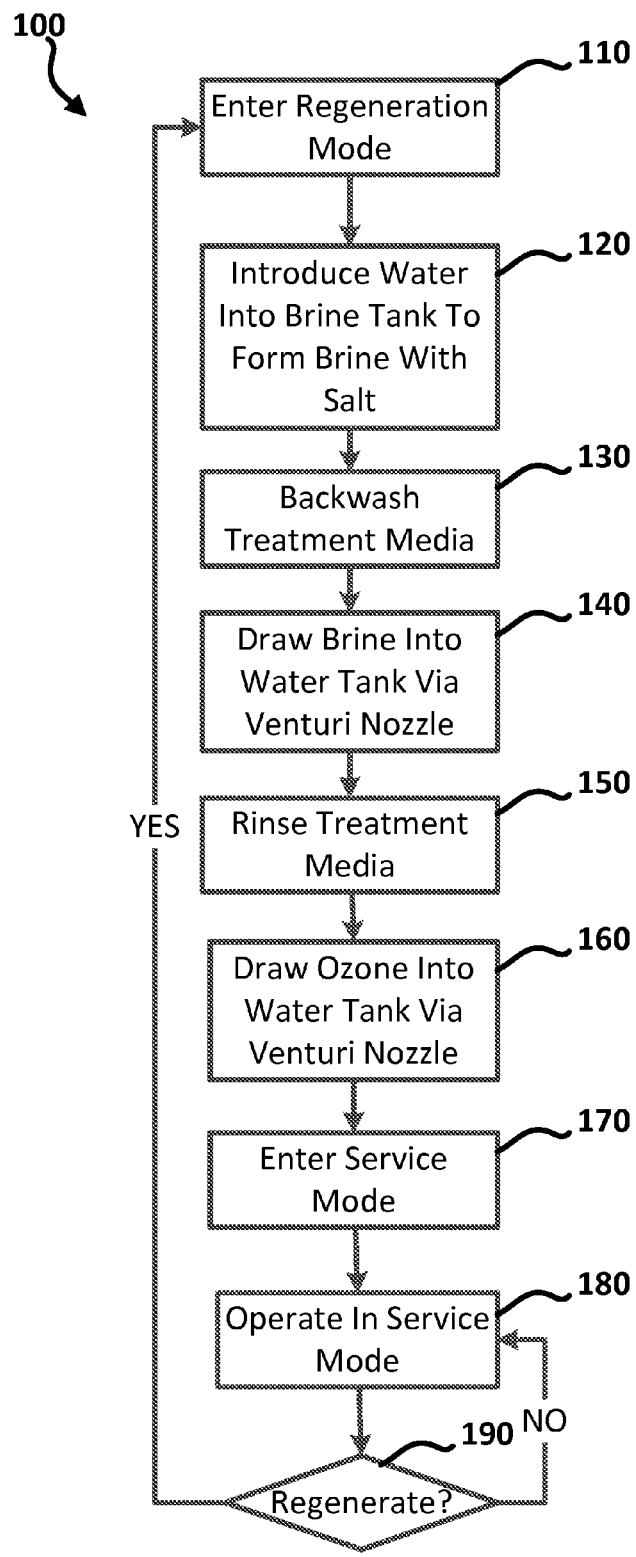
FIG. 2 is a flow diagram of a method for regenerating a water treatment system according to an embodiment.

A flow diagram of a method 100 for regenerating water treatment system 10 according to an embodiment is shown in FIG. 2. Once the water softener valve 50 causes water treatment system 10 to enter regeneration mode (step 110), water softener valve 50 begins to enable redirection of source water into the brine tank 20 via conduit 80 (step 120). The water entering brine tank 20 mixes with the salt 22 that is contained therein to produce the salty brine. When the amount of source water entering brine tank 20 reaches a predetermined level, as gauged by the water softener valve (float 26 is also provided to ensure levels in brine tank 20 do not rise to overflowing), the water softener valve 50 enters a backwashing stage during which water is forced into the water tank 30, lifting the water softening media 32 for cleaning and discarding impurities collected in the water softening media 32 down a drain into the sewer or otherwise out of the water treatment system 10 (step 130).

With backwashing having been completed, the water softener valve 50 then permits brine formed in the brine tank 20 to be drawn by suction of the venturi nozzle 52 out of the brine tank 20 and into the water tank 30 via the first port A of T-junction 60 (step 140). This suction at venturi nozzle 52 is induced in a known manner. In particular, the water softener valve 50 receives a flow of source water and associates the flow of source water with the venturi nozzle 52 thereby to induce a low pressure zone at the venturi nozzle 52 that, in turn, causes a vacuum to be imparted within conduit 80.

After the brine being drawn from brine tank 20 has been run through the water softening media 32 as described above, the water softener valve 50 switches to a rinse stage of the regeneration mode (step 150) which includes drawing source water into the water tank 30 to rinse the water softening media 32 and push excess brine out of the water treatment system 10 and down a drain.

Once the rinse stage is complete, regeneration continues with the water softener valve 50 as control system signalling, via relay terminal 55, relay switch 47 of ozone gas source 40 to in turn cause ozone gas generator 42 to begin generating ozone gas. Relay switch 47 also in turn electrically triggers opening of a solenoid valve 41 in ozone gas source 40 to enable ozone gas now being generated to be drawn from outlet 48 of ozone gas source 40 via conduit 49. Primarily, and preferably exclusively, ozone gas rather than any brine in the brine tank 20 is drawn through the T-junction 60 during this period due to the ozone gas being easier to draw than the brine. The water treatment system 10 thereby enters a second, different, draw cycle during which suction again induced as described above at the venturi nozzle 52 causes vacuum to be imparted within conduit 80. However, during this second draw cycle, ozone gas is drawn from outlet 48 of ozone gas source 40 via conduit 49, through conduit 80 and into the water tank 30 via venturi nozzle 52.

In this embodiment, the water softener valve 50 is configured to send a signal along signal wire 56 once the previous steps of the regeneration have been completed in order to invoke a second draw cycle. The signal may simply be in the form of a threshold change in DC voltage along the signal wire 56 that causes relay switch 47 to change states. This may be done by programming the water softener valve 50 to trigger the ON signal at the relay terminal 55 after a predetermined amount of time since regeneration began has expired, where the predetermined time corresponds to about the amount of time it would take to reach the end of the rinse stage. For example, the predetermined time may be set at 30 minutes.

The ozone gas received by T-junction 60 in this way is drawn by suction caused by venturi nozzle 52 through third port C of T-junction 60 along conduit 80 to be introduced into water tank 30 (step 160) via venturi nozzle 52. Water softener valve 50 permits a suitable volume of ozone gas to enter into water tank 30 to form a fresh ozone gas layer 38 at the top of water tank 30, above the regenerated water treatment media 32 and any water remaining therein. This is done by maintaining the ON signal at the relay terminal 55 in the water softener valve 50 for an amount of time corresponding to the time required for a suitable amount of ozone gas being produced to be conveyed into the water tank 30. Once the second brine draw cycle is complete, water softener valve 50 then removes the ON signal at the relay terminal 55, to signal relay switch 47 to cause ozone gas generator 42 to cease production of ozone gas and also to close solenoid valve 41.

With the water softening media 32 having been regenerated and the fresh ozone gas layer 38 having been introduced, the water softener valve 50 re-enters service mode (step 170) and operates in service mode (step 180) so that source water can enter water tank 30 from water softener valve 50 and be treated for use. During service mode (step 180), the source water entering water tank 30 passes through water softener valve 50 and into the top of water tank 30 such that it necessarily passes through ozone gas layer 38 for disinfecting before coming into contact with water softening media 32 for softening. Contact with the ozone gas layer 38 in this manner potentially treats the water sufficiently to kill bacteria, bacteria iron, sulphur reducing bacteria, and neutralize odour, as some examples.

In the event that water softener valve 50 determines that regeneration should be done again (step 190), the method re-enters regeneration mode (step 110) and repeats the process described above. Otherwise, the water treatment system 10 continues to operate in service mode (step 180).

In various implementations of the water treatment system 10, regeneration mode may include all regeneration steps as described above, or alternatively only a subset of these steps. For example, should the efficacy of the layer of ozone gas for disinfecting diminish significantly well before the water softening media requires regeneration, it may be desirable to simply conduct another second brine draw cycle to replenish the layer of ozone gas rather than conduct full regeneration. The ability to provide such granular control may depend in part upon the functionality made available through control board 54 of the water softener valve 50.

Figure 3:
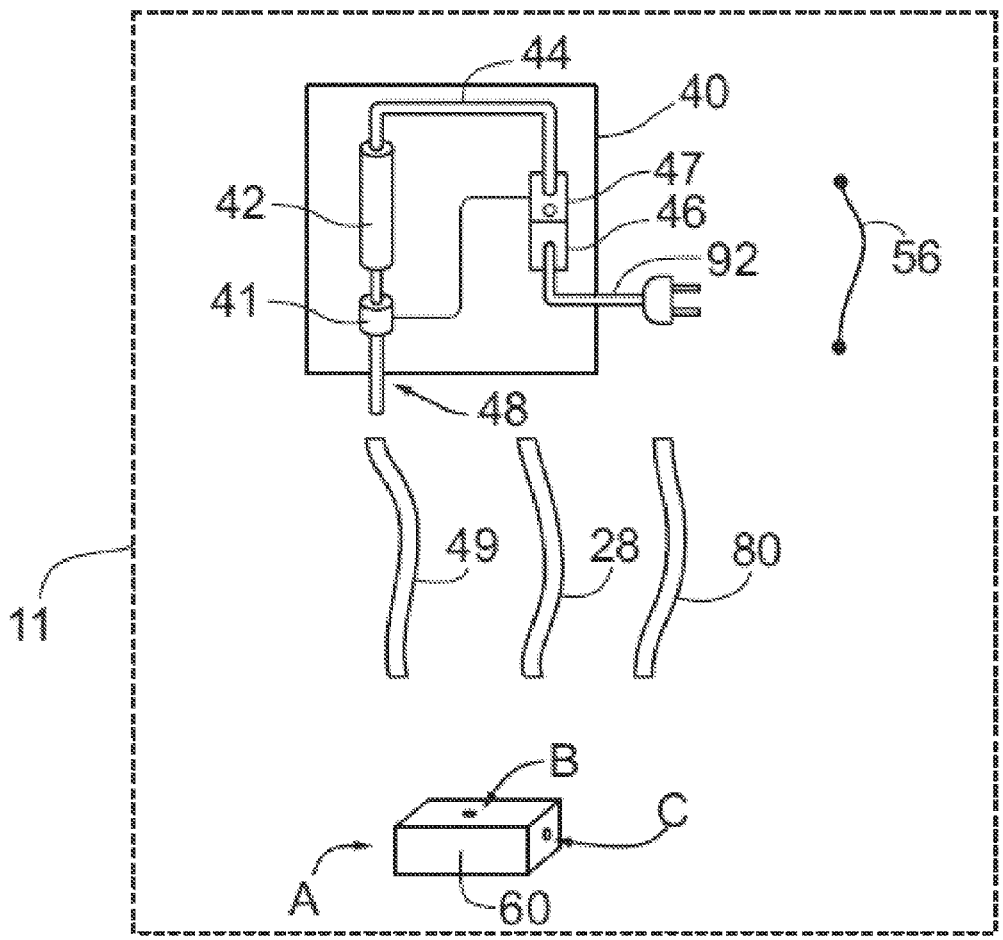
FIG. 3 is a schematic diagram of an ozone kit for a water treatment system according to an embodiment.

Ozone treatment may be provided as a supplement to an existing or installed water treatment system that includes a regenerating fluid source, a water tank and a control system, by way of an aftermarket kit, such as kit 11 shown in FIG. 3. Kit 11 could be made available to consumers in retail outlets and/or provided to service personnel as part of an upgrade service. For example, kit 11 could include an ozone gas source 40 and a T-junction 60 having a first port A that is configured to be in fluid communication with the regenerating fluid source such as brine tank 20, a second port B that is configured to be in fluid communication with an outlet of the ozone gas source 40, and a third port C that is configured to be in fluid communication with the venturi nozzle 52 of the water tank 30. The T-junction 60 would permit regenerating fluid from the first port A to be drawn through the venturi nozzle into the water tank 30, and to permit ozone gas from the second port B to be drawn through the venturi nozzle 52 into the water tank 30. In an embodiment, signal wire 56 could be included with kit 11, along with conduits 49, 28 and 80 in the form of plastic tubes. The consumer or service personnel, perhaps with the guidance of an instruction manual, would arrange the components of the kit in relation to the existing water treatment system components as has been described above so as to supplement the existing water treatment system with the capability of providing the ozone for water treatment.

Although embodiments have been described with reference to the drawings, those of skill in the art will appreciate that variations and modifications may be made without departing from the spirit and scope thereof as defined by the appended claims.

For example, the solid state relay 47 may be replaced by a component that operates in substantially the same way to enable the water softener valve 50 to trigger the ozone gas source 40 to release ozone gas.

In an alternative embodiment, the ozone gas generator 42 may be triggered to generate ozone gas not directly by the control board 54 of water softener valve 50 as control system, but by other means. That is, embodiments are contemplated in which a direct or controlling association between water softener valve 50 and the ozone gas source 40 is not required in order to trigger release of ozone gas for conveying into water tank 30 via venturi nozzle 52.

Figure 4:
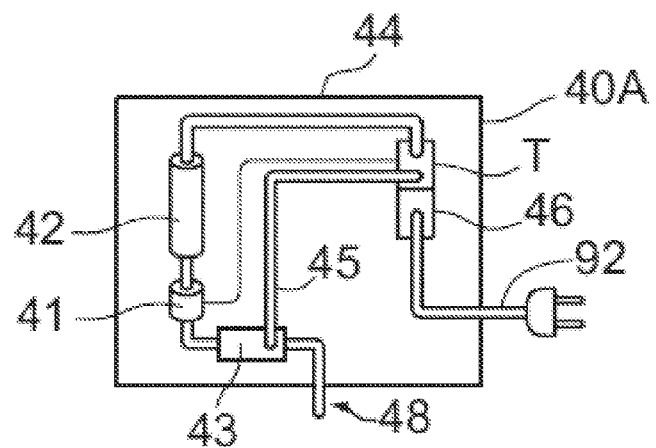
FIG. 4 is a schematic diagram of an ozone gas generator for a water treatment system according to an alternative embodiment.

For example, a schematic diagram of an alternative embodiment of an ozone gas source 40A for a water treatment system is shown in FIG. 4. In this embodiment, ozone gas source 40A includes a vacuum-activated switch 43, such as that provided by Ozotech Inc. of Yreka Calif., U.S.A. under part number 31503WC, that is configured to detect a threshold level of vacuum imparted to the outlet 48 of ozone gas source 40A, indicating that a draw cycle of regeneration has been initiated by water softener valve 50. In response, the vacuum switch 43 triggers an electric timer T to begin a delay period. During this delay period the draw cycle of the water softener valve 50 draws regenerating fluid from the brine tank 20, through first port A of T-junction 60 and out of third port C along conduit 80 to be introduced into water tank 30 via venturi nozzle 52. In this embodiment, the delay period is 30 minutes. The draw cycle continues in this manner until the delay period of electric timer T lapses, at which point electric timer T either directly or indirectly triggers ozone gas generator 42 to begin generating ozone gas and also triggers a solenoid valve 41 either directly or indirectly to open thereby to permit ozone gas to be conveyed towards outlet 48 as it is being generated. The water softener valve 50 is configured to maintain the draw cycle past the delay period. This may be arranged by adjusting timing settings on the water softener valve 50, or simply having a delay period for timer T that is shorter than the length of the draw cycle yet suitable for drawing sufficient brine and for drawing sufficient ozone gas.

While the draw cycle is active but after the delay period of the electric timer T, the ozone gas being generated is drawn through outlet 48 along conduit 49 into second port B of T-junction 60 and out of third port C to be conveyed along conduit 80 into water tank 30 via venturi nozzle 52. Primarily, and preferably exclusively, ozone gas rather than any brine in the brine tank 20 is drawn through the T-junction 60 after the delay period due to the ozone gas being easier to draw than the brine. After an ozone gas draw period, the electric timer T signals ozone gas generator 42 to cease generating ozone gas, and also causes solenoid valve 41 to close. The water softener valve 50 may be configured to complete its draw cycle at or about the same time, and then water softener 50 automatically enters into the rinse stage of regeneration mode thereby to rinse excess regenerating fluid from the treatment media in the water tank 30.

In the alternative embodiment described above, the rinse stage occurs after the ozone gas is drawn into the water tank, rather than before as in other embodiments described herein. This is because a single draw cycle is being employed for both brine draw and ozone gas draw. Because rinse water enters into the water tank 30 after the ozone gas has been drawn into the water tank 30, and passes through the ozone gas layer 38 prior to being drawn out again, a reduction in ozone gas concentration in the ozone gas layer 38 from the initial ozone gas concentration may be caused.

Features of this embodiment may be provided in kit form, the kit including ozone gas source 40A, for coupling with a water treatment system that does not necessarily itself have features that can be programmed or otherwise configured to enable control of an ozone gas source in the manner described above.

In an alternative embodiment, the ozone gas source may be under the control of an independent timer that is synchronized with the timing of cycles of a water softener valve, to generate and release ozone gas at and for predetermined times that correspond to a second draw cycle, or a portion of a single draw cycle, of the water softener valve.

Alternatives to the ozone gas source as described herein may be employed. For example, an ultraviolet, or ultraviolet vacuum type ozone gas generator may be employed for generating ozone gas, and work in substantially the same way in respect of the water treatment system described herein as the corona discharge-type ozone gas generator. Furthermore, an ozone gas source that comprises a tank of ozone gas, perhaps compressed ozone gas, may alternatively be employed and configured in a manner to release its stored ozone gas via its outlet under direction of the water softener valve 50 directly or in response to vacuum being detected by a vacuum detector, or in accordance with predetermined timing, as described herein.

What is claimed is:

1. A water treatment system comprising:
   an ozone gas source;
   a regenerating fluid source;
   a water tank;
   a manifold having a first port in fluid communication with the regenerating fluid source, a second port in fluid communication with an outlet of the ozone gas source, and a third port in fluid communication with the water tank via a venturi nozzle; and
   a control system configured to:
      cause regenerating fluid to be drawn through the venturi nozzle into the water tank; and
      cause ozone gas to be drawn through the venturi nozzle into the water tank.

2. The water treatment system of claim 1, wherein the regenerating fluid is brine.

3. The system of claim 1, wherein the ozone gas drawn into the water tank forms a layer of ozone gas at the top of the water tank.

4. The system of claim 1, wherein the control system is further configured to cause regenerating fluid from the first port and ozone gas from the second port to be drawn through the venturi nozzle separately.

5. The system of claim 1, wherein the control system is further configured to direct the ozone gas source to begin and end releasing ozone gas for conveying out of the outlet towards the second port.

6. The system of claim 5, wherein the control system is further configured to direct the ozone gas source to begin and end producing ozone gas for releasing.

7. The system of claim 1, wherein the ozone gas source further comprises a switch configured to trigger the ozone gas source to begin and end releasing ozone gas for conveying out of the outlet in response to detecting a threshold level of vacuum imparted to the outlet of the ozone gas source.

8. The system of claim 7, wherein the switch is further configured to direct the ozone gas source to begin and end producing ozone gas for releasing.

9. The system of claim 1, wherein the ozone gas source comprises an ozone gas generator.

10. The system of claim 1, wherein the ozone gas source comprises an ozone gas tank.

11. An ozone kit for a water treatment system that comprises a regenerating fluid source, a water tank and a control system, the kit comprising:
    an ozone as source; and
    a manifold having a first port configured to be in fluid communication with the regenerating fluid source, a second port configured to be in fluid communication with an outlet of the ozone gas source, and a third port configured to be in fluid communication with a venturi nozzle of the water tank; and a switch configured to detect a threshold level of vacuum imparted to the outlet of the ozone gas source and in response to trigger the ozone gas source to release ozone gas.

12. The kit of claim 11, wherein the ozone gas source is controllable by the control system of the water treatment system to begin and end releasing ozone gas for drawing through the venturi nozzle into the water tank.

13. The kit of claim 11, wherein the ozone gas source comprises an ozone gas generator.

14. The kit of claim 11, wherein the ozone gas source comprises an ozone gas tank.

15. An ozone kit for a water treatment system that comprises a regenerating fluid source, a water tank and a control system, the kit comprising:

an ozone gas source; and a manifold having a first port configured to be in fluid communication with the regenerating fluid source, a second port configured to be in fluid communication with an outlet of the ozone gas source, and a third port configured to be in fluid communication with a venturi nozzle of the water tank; and a first conduit for providing fluid communication between the first port and the regenerating fluid source of the water treatment system, a second conduit for providing fluid communication between the second port and the ozone gas source, and a third conduit for providing fluid communication between the third port and the water tank of the water treatment system.

16. The kit of claim 15, wherein the ozone gas source comprises a relay switch in electrical communication with the ozone gas generator and that is electrically controllable by the control system of the water treatment system.

* * * * *